United States Patent

Santa Cruz et al.

Patent Number: 5,722,713
Date of Patent: Mar. 3, 1998

[54] VEHICLE ARM REST

[76] Inventors: Cathy D. Santa Cruz, 401 Canyon Way #43, Sparks, Nev. 89434; Andrew R. Hope, P.O. Box 1177, Captain Cook, Hi. 96704

[21] Appl. No.: 501,814

[22] Filed: Jul. 12, 1995

[51] Int. Cl.⁶ .................................. B60J 9/00
[52] U.S. Cl. ........................ 296/153; 297/411.22
[58] Field of Search .................... 296/153, 152; 297/411.2, 411.22, 411.21, 411.46; 5/644, 911

[56] References Cited

U.S. PATENT DOCUMENTS

| | | | |
|---|---|---|---|
| 3,147,035 | 9/1964 | Lichtig | 296/153 |
| 3,899,797 | 8/1975 | Gunst | 5/911 X |
| 4,730,867 | 3/1988 | Cluba | 296/153 |
| 4,810,026 | 3/1989 | Doane | 296/153 |
| 4,950,023 | 8/1990 | Waller et al. | 297/411.22 X |
| 4,982,921 | 1/1991 | Sanders | 248/118 |
| 5,004,292 | 4/1991 | Horne | 296/153 |
| 5,010,996 | 4/1991 | Washburn | 296/153 |
| 5,173,979 | 12/1992 | Nennhaus | 5/644 X |
| 5,205,606 | 4/1993 | Cassese | 296/153 |
| 5,460,102 | 10/1995 | Pasmanick | 108/43 |

FOREIGN PATENT DOCUMENTS 716945  10/1966  Italy ........................ 296/153

Primary Examiner—David M. Mitchell
Assistant Examiner—Kia M. Robinson

[57] ABSTRACT

Herein disclosed is an arm rest which is removably attached to either the window glass and/or the window sill within a vehicle door. It includes a support structure which is either removably or fixedly attached to a moldable bag, with the bag having ergonomic qualities and variable weight means within.

5 Claims, 2 Drawing Sheets

VEHICLE ARM REST

FIELD OF THE INVENTION

This invention relates to a vehicle arm rest but more particularly relates to a vehicle arm rest which is removably attached to either the window slot or the window glass and it may be adjustable, include variable weight means and has inherent ergonomic qualities.

BACKGROUND OF THE INVENTION

In the past, numerous attempts have been made to provide a vehicle arm rest which is removably attached to a vehicle window. Many of these prior art arm rests are functional, however, each have common inherent disadvantages and/or drawbacks which the present invention addresses and overcomes, as will be seen.

U.S. Pat. Nos. 5,010,996 and 4,730,867 each provide a vehicle arm rest which includes an elongated vertical slot for receiving the window glass there within.

U.S. Pat. Nos. 5,205,606, 5,004,292 and 4,810,026 each provide means for removably affixing the arm rest within the window sill slot.

U.S. Pat. No. 4,982,921 provides a window arm rest which is removably affixed by an attachment means of the loop and pile variety to the interior side of the vehicle door.

U.S. Pat. Nos. 4,810,026, 4,730,867 each are formed from extruded plastic which is not a comfortable surface for placement of the users arm when used for a prolonged period of time.

U.S. Pat. Nos. 5,205,606, 5,010,996, 5,004,292 and 4,982,921 each cover and/or form the arm rest surface with either flexible material or a cushion.

Each of the prior art references cited include at least one or more of the following disadvantages. Due to the many different types of vehicle doors having various sized widths, most prior art arm rests are therefore not universal and they do not include variable adjustment means so as to allow the user increased alternate comfortable positions of choice. A further disadvantage of the prior art is lack of ergonomic qualities, as each are made from a material which is not moldable. Still a further disadvantage is the lack of variable weight means so as to allow the arm rest when in various positions to remain balanced. Yet another disadvantage is that each reference is limited to either attachment to the window glass or attachment to the widow sill, not both.

SUMMARY OF THE INVENTION

The present invention is an improved vehicle arm rest having unique qualities which overcome the disadvantages of the prior art. The arm rest of the present invention (as shown in a first embodiment) teaches a support structure having attachment means for removably attaching the structure to the window glass, or (as shown in a second embodiment) the support structure includes attachment means for removably attaching the structure to the window sill slot. Further embodiments (as shown throughout the various views) may include multiple and/or combinations of the support structure having various attachment means, whereby, the support structure may be adjusted by the individual user and attached at a position of choice as the arm rest may be adjusted vertically as well as horizontally. The support structure further includes means to fixedly or removably attach a moldable bag. The bag may include means to be filled with a variable weight means such as buckshot, (a bean bag), liquid or sand, etc., thus the bag provides a moldable surface for placement of the users arm, whereby, further providing ergonomic qualities as the bag conforms to the shape of each individual users arm.

It is therefore a primary object of the present invention to provide a new and improved vehicle arm rest which has all of the advantages of the prior art and eliminates all of the disadvantages.

Yet another object of the present invention is to provide a vehicle arm rest which may be adjustably positioned in either a vertical or horizontal direction.

Still another object of the present invention is to provide a vehicle arm rest which is of durable and reliable construction.

Yet another object of the present invention is to provide a vehicle arm rest which is portable and removably affixed to the widow sill or the glass.

Still another object of the present invention is to provide the aforementioned structure with means for either fixedly or removably attaching a bag.

Another object of the present invention is to provide the aforementioned bag with means to be filled with a variable weight means, such as sand, liquid, buckshot, or the like.

Yet another object of the present invention is to provide an arm rest which is easily manufactured and marketed.

These and further objects and advantages of the present invention will be readily understood as the following description is read in conjunction with the accompanying drawings, wherein like reference numerals have been used to designate like elements throughout the various views.

DETAILED DESCRIPTION OF THE DRAWINGS

Figure 1:
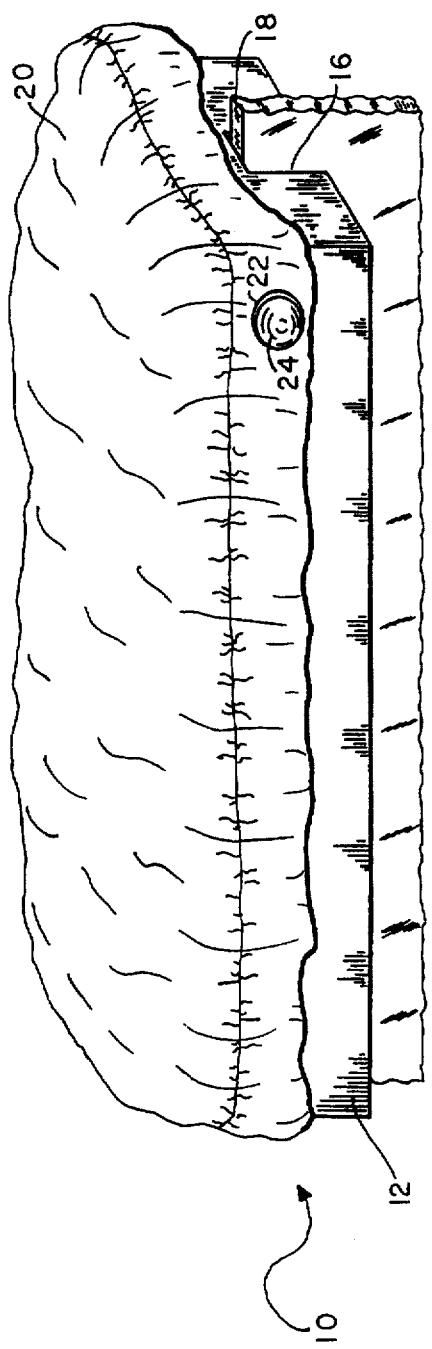
FIG. 1, is a perspective view showing the preferred embodiment.

In FIG. 1, arrow 10 represents an overview of the present invention which is an arm rest attachable to a vehicle window. It is to be noted that throughout the various views we have provided various attachment means for attaching the arm rest to a vehicle having a door, with the door having a window, a window sill defining a slot adjacent to the window and a door panel disposed below the window sill and/or the arm rest is attachable to the vehicle window with the window containing glass and the glass having at least one exposed edge 18.

Figure 2:
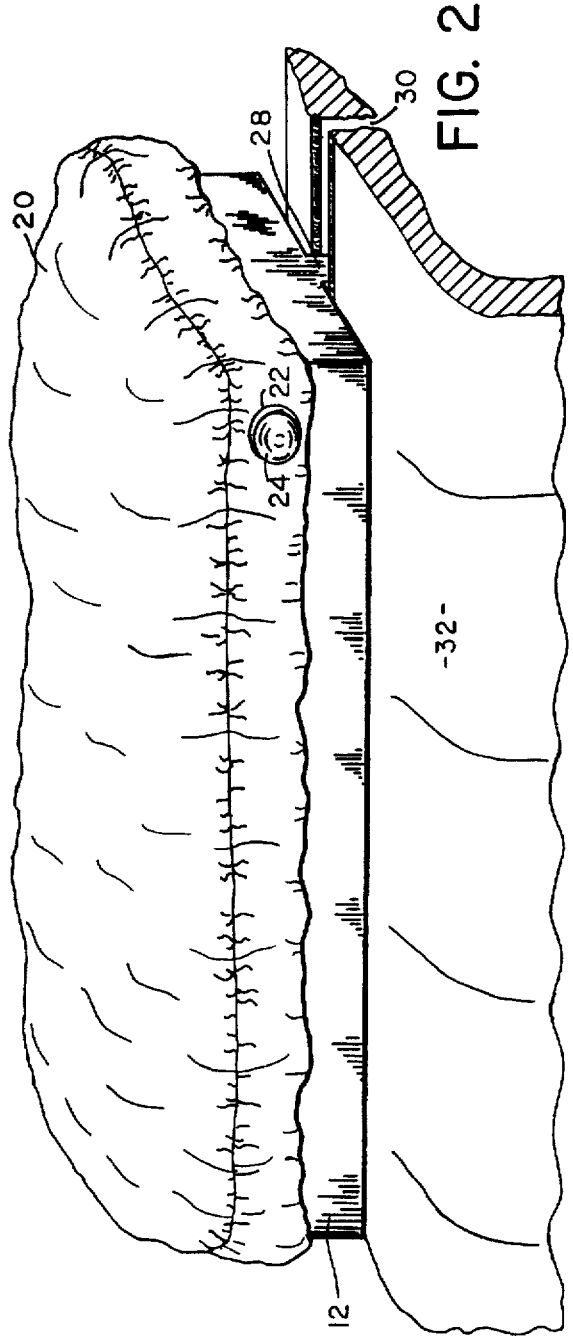
FIG. 2, is a perspective view showing a second embodiment.
Figure 3:
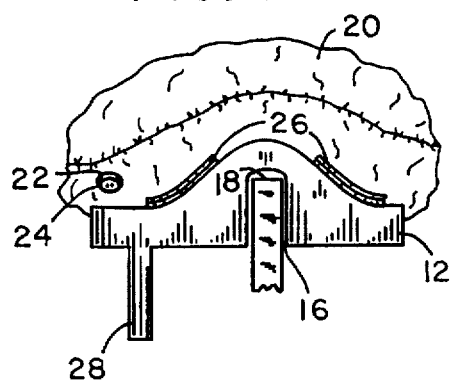
FIG. 3, is an end view of a third embodiment when in a first position.
Figure 4:
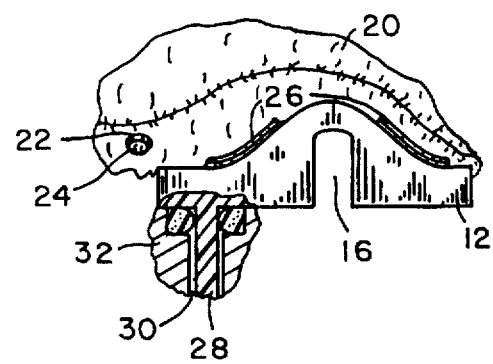
FIG. 4, is an end view of the embodiment of FIG. 3, when in its second position and further includes a partial cut-a-way section of the arm rest when attached to a vehicle window sill.
Figure 5:
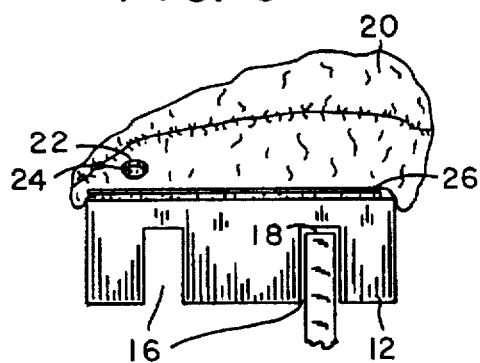
FIG. 5, is an end view of a fourth embodiment when in a first position.
Figure 6:
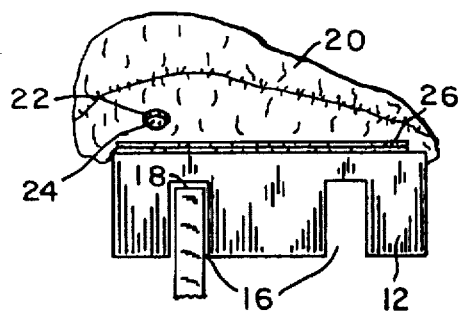
FIG. 6, is an end view of the embodiment of FIG. 5, when in a second position.
Figure 7:
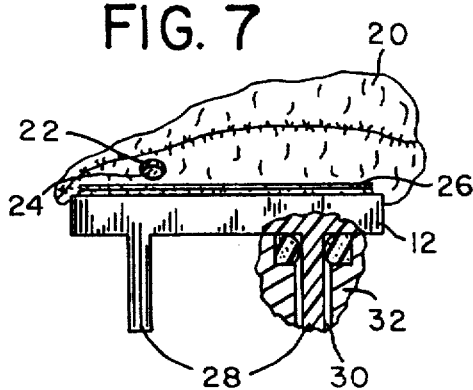
FIG. 7, is an end view of a fifth embodiment when in a first position and further includes a partial cut-a-way section of the arm rest when attached to a vehicle window sill.
Figure 8:
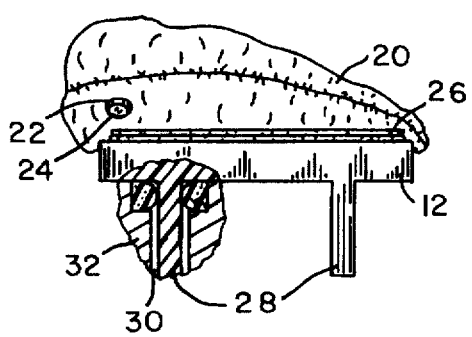
FIG. 8, is an end view of the embodiment of FIG. 7 when in a second position and further includes a partial cut-a-way section of the arm rest when attached to a vehicle window sill.

In FIG. 1, 12 is a support structure which may be made from a variety of materials such as, rubber, plastic, metal, wood, etc. The preferred embodiment teaches the support structure 12 being substantially elongated having a complete axial length. Provided within the support structure 12 is substantially a groove 16 which is formed along the complete axial length of the support structure 12, as shown in FIGS. 1, 3, 4, 5 and 6. The groove 16 is substantially of a shape and size to be positionable over the exposed edge 18 of the window glass so as to removably attach the support structure to the exposed edge 18. Throughout the various views, 20 represents a bag with the bag being made from any material which allows the bag to be moldable, such as plastic, which is capable of being deformed continuously in any direction without rupture when under a stress exceeding a yield value equal to or less than that of a human arm, therefore the bag 20 has inherent ergonomic qualities. The bag 20 is of a length substantially equal to or less than the axial length of the support structure 12 and is of a width to extend beyond or less than the width of the support structure 12. The bag 20 may include means to be filled with a variable weight means. The means to fill the bag 20 may be any suitable means such as a hole 22, with the hole 22 being located at a position of choice and is of a shape and size to frictionally retain a plug 24 therewithin, whereby, the variable weight means is inserted and contained within the bag 20 in a secure and water-proof manner. It is to be noted that the variable weight means may be any material or substance which allows the bag 20 to be moldable, such as liquid, sand, buckshot, etc., or the like, (variable weight means not shown). The bag 20 may be fixedly attached to the support structure by any suitable means, such as glue or the like, as shown in FIGS. 1 and 2, or the support structure 12 may include a fastener means to removably attach the bag 20, such as a fastener means of the loop and pile variety, VELCRO 26, or the like, as shown in FIGS. 3–8.

Shown in FIGS. 2, 3, 4, 7 and 8, the support structure may include a downwardly extending projection 28 formed along the complete axial length of the support structure 12, with the projection 28 being of a shape and size to allow the projection 28 to be positionable within the window slot 30, of the vehicle door 32.

Taught throughout FIGS. 3–8, we have shown the support structure 12 having various combinations and/or multiples of the groove 16 and/or multiples of the projection 28, therefore, when the support structure 12 includes the above noted combinations and/or multiples, the support structure 12 may be adjusted by the individual user for complete comfort, when the arm rest is positioned in either a first or second position, as shown throughout the various views.

Further represented throughout views 3–8, we have shown various positions for the bag 20, whereby, the variable weight means (when in the various positions) is distributed in a manner so as to allow the arm rest to be positioned in either a first or second position in a balanced manner.

It will now be seen that we have provided a vehicle arm rest having unique qualities and/or features heretofore not seen.

It will also be seen that we have provided an arm rest which may be positioned and adjusted in either a vertical direction or a horizontal direction.

It will further be seen that we have provided an arm rest which is portable and removably affixed to either the window sill or the glass within the window.

It will also be seen that we have provided an arm rest which includes means to be removably or fixedly attached to a bag.

It will further be seen that we have provided an arm rest which includes unique ergonomic qualities.

It will also be seen that we have provided an arm rest which includes variable weight means with the weight means being distributed in a balanced manner when the arm rest is in various positions.

Although the intention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatuses.

Having described our invention, what we claim as new and desire to secure by Letters Patent is:

1. An arm rest for use with a vehicle door, said door having a window, a window sill defining a slot adjacent to said window, a door panel disposed below said window sill and glass having at least one exposed edge, said arm rest comprising: an integrally formed support structure having a top portion and a bottom portion, an integrally formed groove extending along the complete axial length of said bottom portion, said groove being positionable over said exposed edge, an integrally formed downwardly extending projection along said complete axial length of said bottom portion, said groove and said projection being separate and spaced apart, said projection being positionable within said slot, a moldable bag having ergonomic qualities, said bag being filled with particulate matter and said top portion being affixed to said bag, whereby, said arm rest assumes a first position of choice when said groove is positioned over said exposed edge and said arm rest assumes a second position of choice when said projection is positioned within said slot.

2. The arm rest of claim 1 wherein said bag includes a hole at a position of choice for receiving said particulate matter therethrough and said hole being of a shape and size to frictionally retain a plug therein.

3. The arm rest of claim 1 in which said particulate matter is buckshot.

4. The arm rest of claim 1 in which said particulate matter is sand.

5. The arm rest of claim 1 in which said top portion being affixed to said bag is by a fastener means of the loop and pile variety for removably attaching said bag.

* * * * *